E. PRATT.
Assignor to S. J. WALLACE.
CULTIVATOR.
No. 7,353.
Reissued Oct. 17, 1876.
Fig. I.
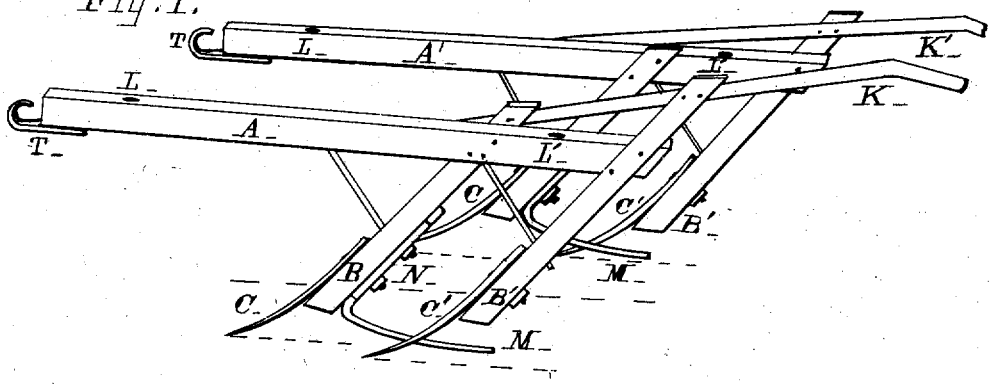
Fig. II.
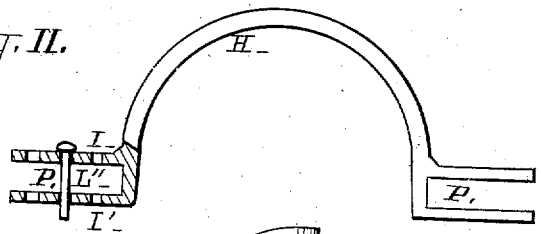
Fig. III.
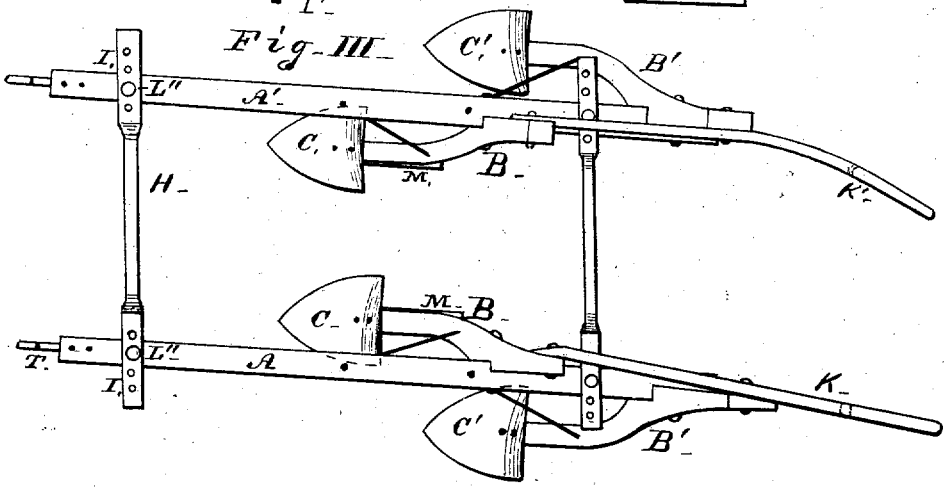
Witness:
C. R. Arnold,
F. M. Pate.
Inventor.
Edward Pratt.
By Saml. J. Wallace.
Attorney.
N. PETERS, PHOTO-LITHOGRAPHER, WASHINGTON, D. C.

UNITED STATES PATENT OFFICE.

EDWARD PRATT, OF ROCK GROVE, ILLINOIS, ASSIGNOR TO SAMUEL J. WALLACE, OF KEOKUK, IOWA.

IMPROVEMENT IN CULTIVATORS.

Specification forming part of Letters Patent No. 44,747, dated October 18, 1864; reissue No. 7,353, dated October 17, 1876; application filed July 12, 1875.

*To all whom it may concern:*

Be it known that I, EDWARD PRATT, now of Rock Grove, Stephenson county, Illinois, and formerly of Grand Detour, in the county of Ogle and State of Illinois, have invented a new and useful Improvement in Cultivators; and I do hereby declare that the following is a full, clear, and exact description of the same, reference being had to the accompanying drawings, making part of this specification, in which—

Figure I is a side view of two plow-frames. Fig. II is a detached view of a curved bar pertaining to the same. Fig. III shows the two plow-frames connected together in front and rear.

Similar letters of reference indicate corresponding parts in the several figures.

This invention relates to a new and improved cultivator, designed for plowing corn and other crops grown in hills or drills, and also for loosening land, &c., in which two plow-beams are connected together and arranged so that each beam will have an independent movement, or one to a certain extent independent, of the other. The plows are held upright, and a rigid tongue, separate draft-evener, and other features heretofore used are dispensed with.

To enable those skilled in the art to fully understand and construct my invention, I will proceed to describe it.

A A′ represent two plow-beams, each of which has two standards, B B′, attached, with shovel-plows C C′ at their lower ends. The standards B B′ are curved, and are attached to opposite sides of the beams A, so as to throw the plows C C′ out of line with each other, the two forward plows being nearer together than the rear ones.

The two beams A A′ are connected together by cross-bars H, the ends of the latter being attached to the beams by pivot-bolts L″. The rear standards B′ of the beams A A′ extend upward to form supports for the handles K K′ for the operator to grasp and guide the implement as it is drawn along.

One draft-animal is attached to each beam, and it will be seen from the above description that each beam, in consequence of being connected by the cross-bars H, is allowed a certain independent movement longitudinally, and may, therefore, be managed and operated with facility in case of meeting with obstructions.

In plowing or cultivating corn, I put onto the two beams A A′ the curved metal bars H, as shown in Figs. II and III. The curved bars H clear the corn and prevent it from being broken down and injured. The cross-bar H, as shown in Fig. II, has two branches, I I′, at each end. These branches have spaces P between them vertically. The plow-beams A A′ are held by these branches by vertical pivot-bolts L″, so the plows may turn sidewise on the pivots and be held upright by them. The plows are changed in distance apart by means of a series of holes for these pivots. The bar curves upward in the center to pass over the row of plants. It has no rigid tongue forward between the horses to hold it rigid; so it swings on its pivots with its ends back and forth, as the horses vary in walk, to serve as a draft-evener, instead of a separate evener apparatus or double-tree.

The front plows C C have attached behind them the runners M. These have slots along their upright portions, by which they are held, by the bolts and nuts N, to the plow-standards, so they may be adjusted vertically to regulate the depth of plowing, and to act as runners in traveling and lifting the plows.

Fig. III shows the two plow-beams A A′ connected in front and rear by holes L L′ through them. They are placed in the interspaces P, between the upper and lower portions I I′, and are held by vertical pivot-bolts L″. The rear connections serve to prevent the plows crowding together or apart when set to throw furrows apart or to the center, and to assist in guiding one by means of the other.

I claim—

1. In cultivators, a cross-bar, H, with elevated center, having at its ends vertical pivots L″, with upper and lower bearings I I′ therefor, and interspaces P, connecting two plow-frames, A A′, so as to hold their plows upright and allow them movement on the pivots, substantially as set forth.

2. The combination, in a walking straddle-row cultivator, of two plow-beams, A A′, each bearing a handle, K, with an elevated cross-yoke, having at its ends pivots L″ and upper and lower bearings I I′, connecting the plow-beams, so as to hold their plows upright and allow either of them to be drawn freely in advance of the other as they are drawn forward, substantially as set forth.

3. The elevated cross-yoke, having pivots L″, and interspaces P in its ends, in combination with two plow-frames, A A′, connected in the rear to hold them from crowding apart or together as they are drawn along in throwing furrows to the center or apart, substantially as set forth.

4. The cultivator, with two plow-beams, A A′, connected without forward tongue, and having the front plows C C combined with vertically-adjustable runners M, substantially as set forth.

EDWARD PRATT.

Witnesses:
E. T. HINKS,
T. CRONEMILLER.